Figure 1:
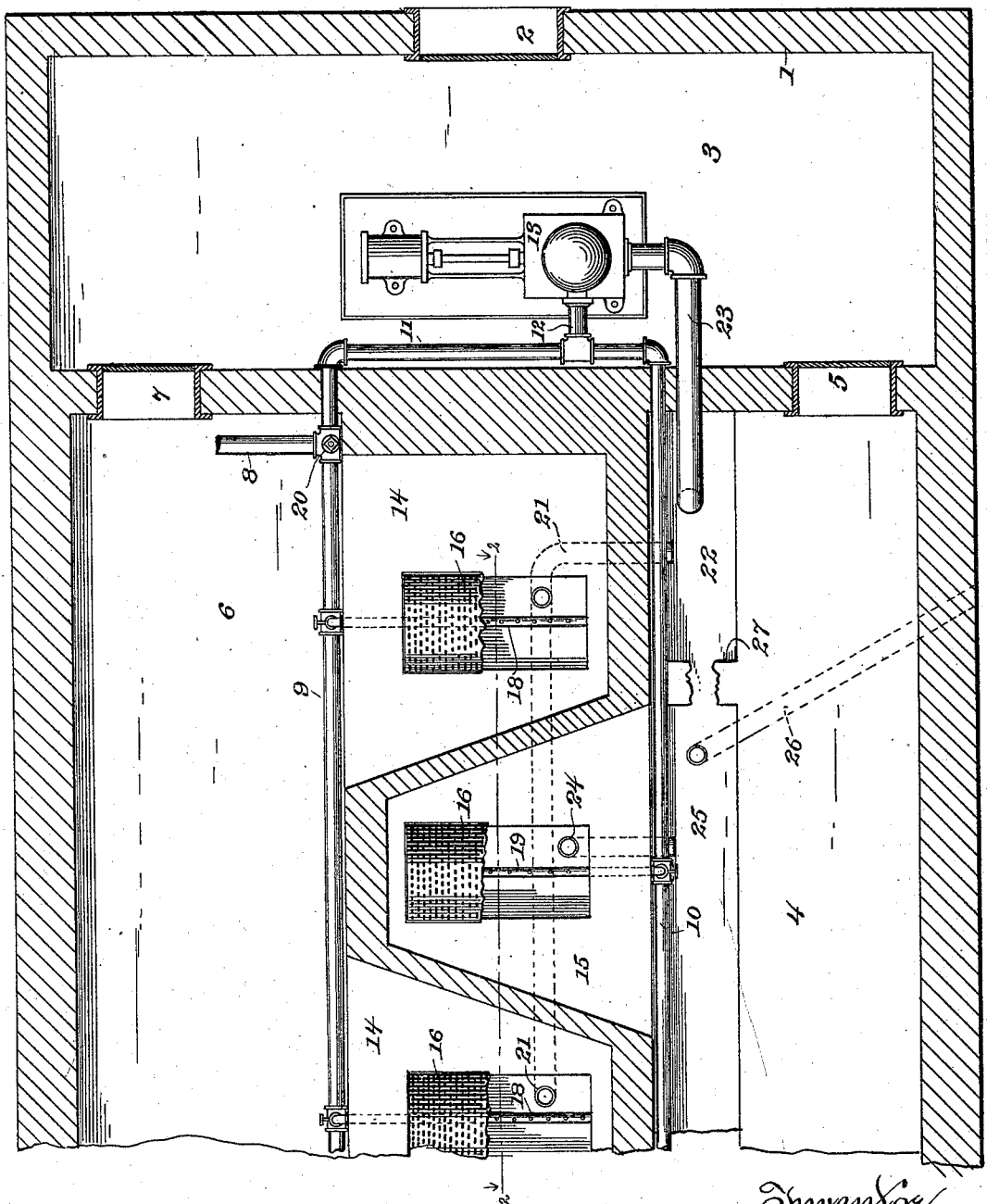

(No Model.) 5 Sheets—Sheet 1.
J. F. DORNFELD.
APPARATUS FOR ATTEMPERATING AIR.

No. 513,487. Patented Jan. 30, 1894.

Witnesses
Geo. W. Torry.
Anna V. Faust.

Inventor
John F. Dornfeld
By Benedict & Morsell
Attorneys

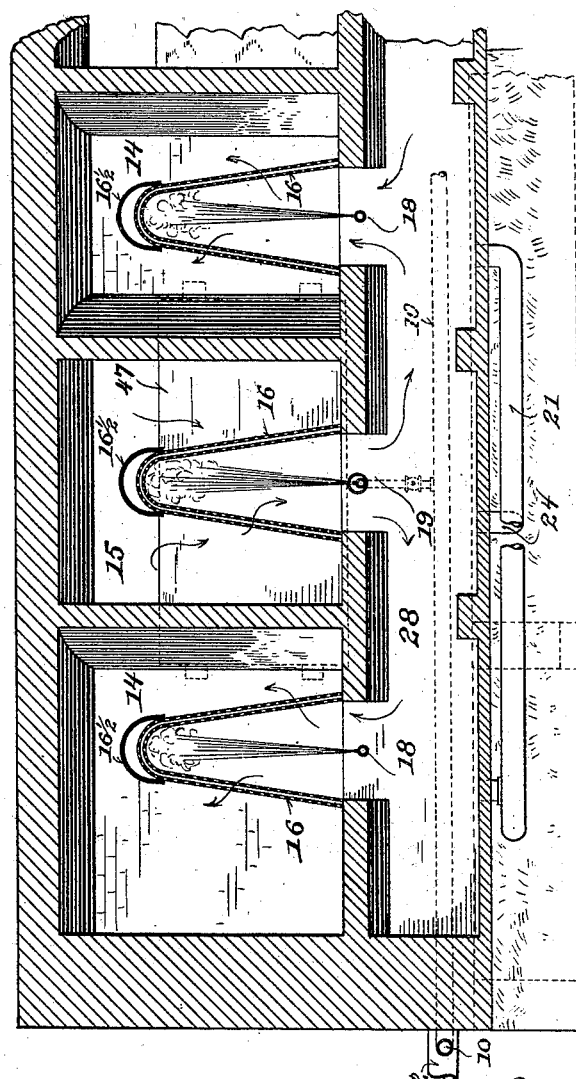

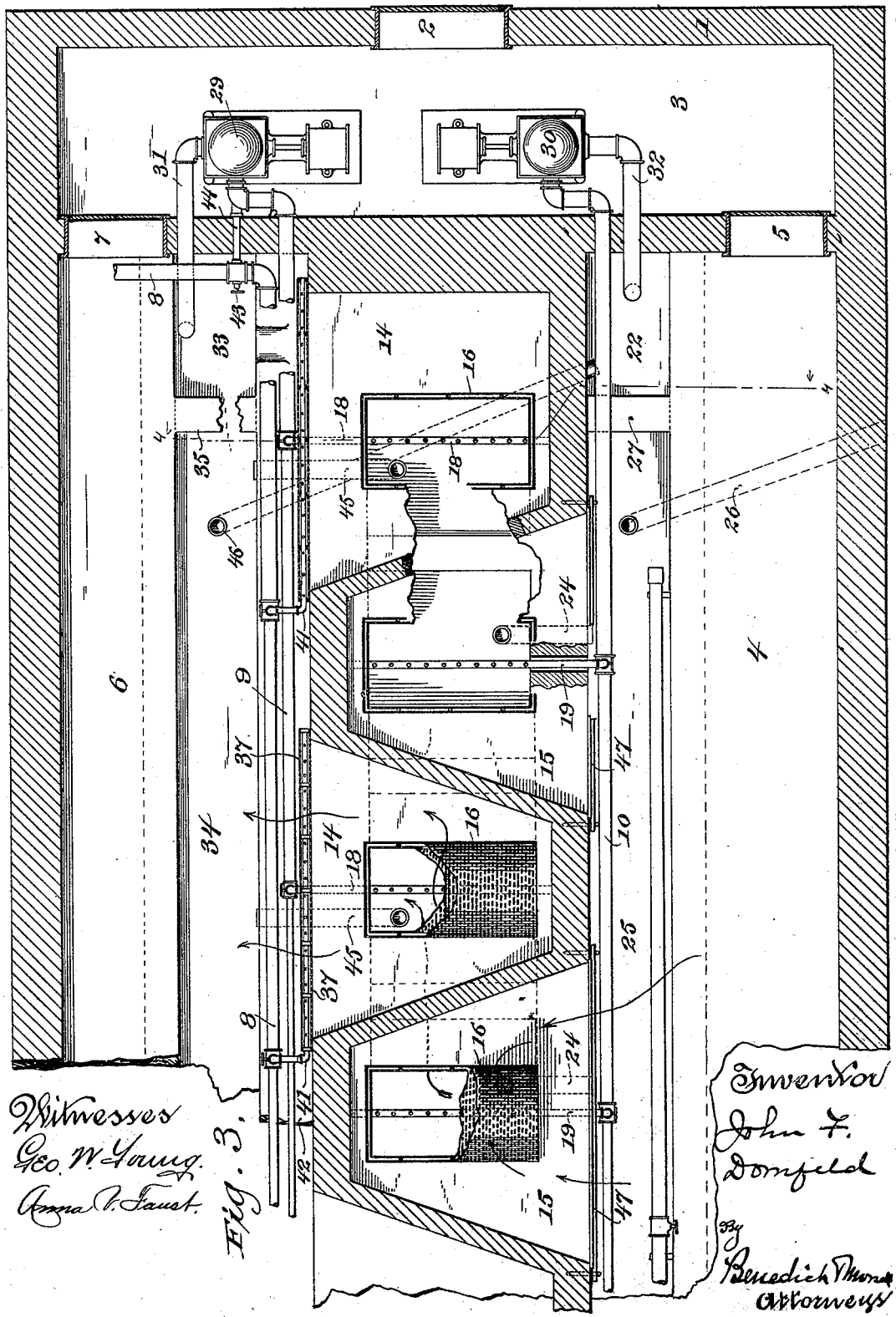

(No Model.) 5 Sheets—Sheet 4.
J. F. DORNFELD.
APPARATUS FOR ATTEMPERATING AIR.
No. 513,487. Patented Jan. 30, 1894.
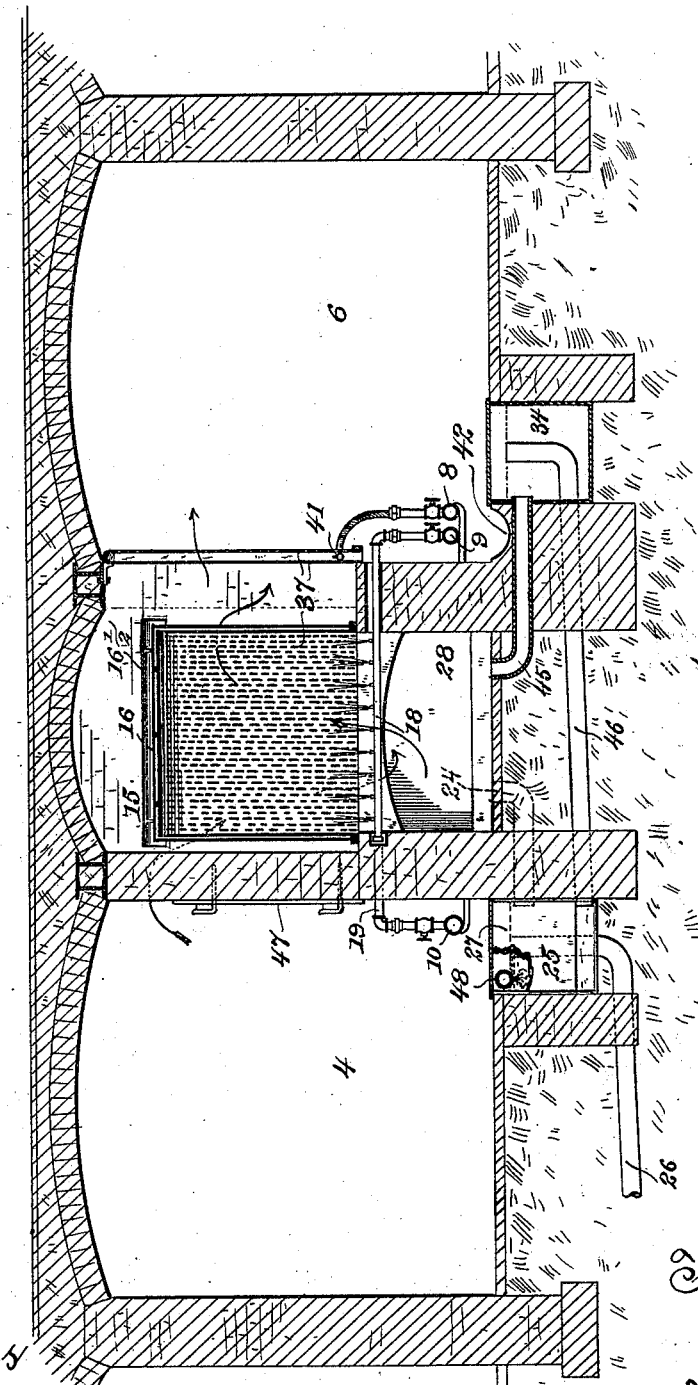

(No Model.) 5 Sheets—Sheet 5.
J. F. DORNFELD.
APPARATUS FOR ATTEMPERATING AIR.
No. 513,487. Patented Jan. 30, 1894.
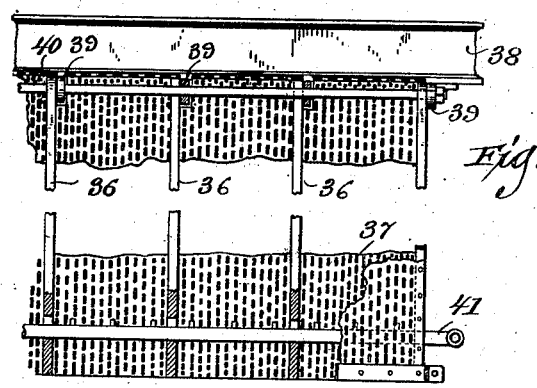
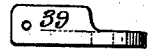
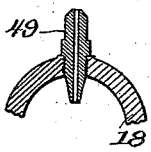
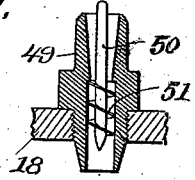
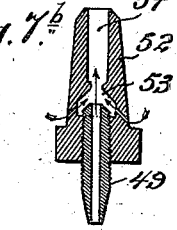
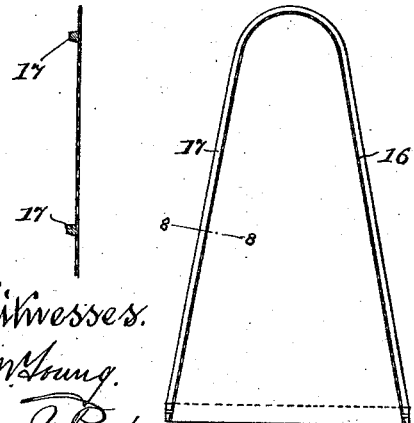

UNITED STATES PATENT OFFICE.

JOHN F. DORNFELD, OF WATERTOWN, WISCONSIN.

APPARATUS FOR ATTEMPERATING AIR.

SPECIFICATION forming part of Letters Patent No. 513,487, dated January 30, 1894.

Application filed January 17, 1893. Serial No. 458,651. (No model.)

*To all whom it may concern:*

Be it known that I, JOHN F. DORNFELD, of Watertown, in the county of Jefferson and State of Wisconsin, have invented a new and useful Improvement in Processes of and Apparatus for Attemperating Air, of which the following is a description, reference being had to the accompanying drawings, which are a part of this specification.

The invention relates to an improved apparatus for attemperating or cooling air or gas by means of water, or other cooling liquid or solution, and is more especially adapted for moistening and cooling large volumes of air used in pneumatic malting, as for instance in connection with the system of pneumatic malting embodied in my application for Letters Patent, for improvements in apparatuses for malting grain, the papers in which case were executed by me on the 24th day of December, 1892.

The object is to effect a thorough interchange of temperature of air and the liquid used for cooling the same, attemperating a large volume of dry and warm air to within a few degrees of temperature contained by the small quantity of fresh supply liquid employed.

With the above primary object in view, the invention consists in the improved apparatus hereinafter more fully described.

In the accompanying drawings, in which like numerals of reference denote like parts throughout the several views, Figure 1, is a horizontal section on a plane above the attemperaters, the tops of said attemperaters being shown partly broken away, and the water arresting cap omitted. Fig. 2, is a longitudinal, vertical, sectional view, on the line 2—2 of Fig. 1, the water arresting cap being in place. Fig. 3, is a similar view to Fig. 1, of a modified form, parts being broken away for clearer illustration. Fig. 4, is a transverse, vertical section of Fig. 2. Fig. 5, is a detail of one of the attemperating screens, parts being broken away. Fig. 6, is a detail of a part of the securing means for said screen. Fig. 7, is a detail sectional view of one form of spraying and atomizing nozzle. Fig. 7ª, is a similar view of another form. Fig. 7ᵇ, is a similar view of still another form. Fig. 8, is a horizontal sectional view on the line 8—8 of Fig. 9. Fig. 9, is an end view of one of the attemperaters; and Fig. 10, is a perspective view of a modification.

Referring to the drawings, the numeral 1, indicates a building or a part of a building, having a pump room 3, a dry air chamber 4, and a moist air chamber 6. Manholes 2, 5 and 7 closed by trap doors are provided for gaining entrance to these chambers. Openings in the walls or ceiling for the passage of air are provided, wherever desired, but as these are located at any points convenient, they are not shown in the drawings.

Referring now particularly to Fig. 1, a fresh water pipe 8, communicates with a second pipe, 9, running longitudinally of the building. A similar longitudinal pipe, 10, runs parallel with pipe 9, although some distance therefrom laterally, and the two pipes are connected by elbow joints with a horizontal pipe, 11, within chamber 3, the latter also having a branch pipe, 12, running to a force pump, 13. Brick work or masonry extends centrally longitudinally of the building and separates the dry and moist air chambers. This masonry is so arranged as to form a series of compartments 14, 14 and 15, three being shown in Fig. 1, which have closed tops, and partly open bottoms transversely. The compartments, 14, have their sides which face the dry air chamber closed with open sides to the moist air chamber, while the intermediate compartment, 15 and any other compartment of a similar character, has or have an open side or sides facing the dry air chamber, with a closed side or sides to the moist air chamber. In each of the compartments, 14, 14, and 15, are arranged attemperaters, 16, which may be either of the form shown in Fig. 9 or of the form illustrated in Fig. 10. In the former figure and also in other figures of the drawings, the attemperater is shown as composed of a semicircular top, flat sloping sides, and solid ends, the whole of the form of a hood. The top and sides are composed, preferably, of perforated metal. Each attemperater comprises two of the hoods of the construction described, one fitting over the other as shown clearly in Fig. 2, and the inner provided with ribs, 17, shown in Fig. 8, to keep the two a slight distance apart. Caps 16½, a little above the tops of the attemperaters are adapted to arrest the water that passes through them and return it to the attemperaters, the longitudinal edges of the caps being fitted to the attemperaters therefor. The form of hood shown in Fig. 10 differs from the other only in providing a flat imperforated top instead of a perforated semi-circular top.

While I have above described each attemperater as consisting of two hoods, yet I do not wish to be understood as confining myself to that particular number, inasmuch as it is obvious that more may be employed without departing from the spirit and scope of my invention. The several attemperaters fit over the openings in the bottom of the compartments, 14, 14 and 15, while branch pipes, 18, 18, extended at right angles from pipe 9, across the openings in the bottoms of compartments, 14, and directly beneath the open under sides of the attemperaters. A similar pipe, 19, extends from pipe 10 beneath the attemperater in compartment, 15. All of these several pipes beneath the attemperaters are provided with a series of fine holes in order to project jets of water up into the attemperaters so as to strike against the under sides of the tops of the inner hoods.

As shown in Fig. 1, it will be seen that at the point of connection between the fresh water pipe, 8, and longitudinal pipe 9, a three-way cock, 20, is provided, by the regulation of which pipe, 9, is enabled to carry either all fresh water or partly fresh or partly pump water. The water entering pipe 9, whether it be all fresh, or partly fresh and partly pump water, flows along said pipe and enters the branch pipes, 18, passing through said pipes and spraying beneath the attemperaters in the compartments 14 after which the water falls, and passes off through a conduit, 21, to a basin, 22, from where it is taken by the pump, 13, through the medium of a pipe, 23. The water thus taken up by the pump is forced through pipe 12 to pipe 10, and thence into the branch pipe, 19, for spraying the attemperater in compartment 15, from which it drops down and passes off through a conduit, 24, to the basin, 25. The water as it settles in basin 25 passes into basin 22, through and under a dividing wall, 27, and finally to pump suction.

The numeral 26 indicates an overflow pipe which has its inner end bent upward at right angles, said bent end entering basin 25, and extending up above the bottom thereof, as clearly shown in Fig. 4. It follows that when the water in basin 25 reaches a level corresponding to the top of this pipe, the water will pass to waste through the pipe, the amount of fresh water used of course regulating the quantity going to waste. It will be noticed from the above description that the water falling from the attemperaters located within compartments 14 passes directly to the basin 22 so as to be utilized again for cooling the air passing through the attemperater located in compartment 15, so that none of the water falling from the attemperaters in compartments 14 passes to waste in the first instance, but only after it has been again utilized for feeding the attemperater in the compartment 15 when any waste will be carried off by the overflow pipe, 26, leading from basin 25, and the amount of water above that passing to waste will be re-utilized for the attemperater in compartment, 15. It will be understood that the pump lowers the level of the water in the smaller or pump suction basin 22, while the water flowing direct to said basin through the pipe 21 is a smaller proportion to that coming along the larger basin and having to pass through and under the partition wall separating the two basins. This wall has a tendency to check any floating dirty substance, and gives such substance a chance to pass off into the sewer, rather than to the pump suction, while heavy matter or sediment will settle at the bottom of the basin 25. The water coming to basin 22 from the compartments 14 is colder than the water falling from the attemperater in compartment 15, in view of the fact that its temperature has only been changed by the air passing through said compartments 14, whereas the temperature of the water from compartment 15 has been affected once by the air passing through compartments 14, and a second time by the air passing through compartment 15. It is therefore an object to keep the water from compartments 14 as far as possible from freely commingling with the water which has fallen from compartment 15, and, to assist in this, the partition wall 27 is found useful. By employing this wall, the water from attemperaters in compartments 14, in order to commingle with the water in basin 25, would have to pass the pump suction and work its way through the contracted stream of water to reach the overflow waste pipe, before it was again used on attemperaters 15; and, again, the water in basin 22 is colder at the surface than the water in the basin 25. The air contained in the dry air chamber, 4, is pressed or forced by any suitable means into the moist air chamber, 6, and in its passage from one chamber to another passes into the compartment, 15, over the partitions 47, hereinafter referred to, as is shown by the arrows in Fig. 3 as the open side of said compartment facing the dry air chamber permits of this course. It then passes freely through the interstices or small openings of the hoods composing the attemperater, and coming in contact with the upward sprays of cold water becomes thoroughly cool, after which it descends and enters the compartments, 14, through the arch opening, 28, as shown by the arrows in Fig. 2, circulating freely through the attemperaters in compartments 14, and becoming affected by the water spraying into these attemperaters and thence passing to the moist air chamber 6 by way of the open sides of compartments 14.

The above description covers the construction shown particularly in Fig. 1, and the effect of the same is to bring the air that enters the dry air chamber from a high temperature to a lower temperature suitable for malting purposes when it reaches the moist air chamber, thus cooling a large volume of air with a comparatively small volume of water.

The form illustrated in Fig. 3 differs from Fig. 1 in that an additional compartment corresponding to 15 is employed. This also necessitates the re-arrangement of the structure in some other particulars, as will hereinafter more fully appear. Two longitudinal pipes are used, corresponding to pipes 9 and 10, the former provided with branch pipes, similar to 18, leading to the compartments 14, and the latter with branch pipes, similar to 19, leading to compartments 15. Pipes 9 and 10 in this instance each lead, respectively, to force pumps, 29 and 30, while said force pumps in turn are provided, respectively, with pipes, 31 and 32, pipe 31 leading to a basin, 33, and pipe 32 leading to a basin corresponding to basin, 22, in Fig. 1. Next to basin 33 is a longer basin, 34, separated from the same by a partition wall, 35, similar to wall 27 having an arched way or opening thereunder.

The open sides of the compartments, 14, 14, facing the moist air chamber are each covered by a screen, shown in detail, Figs. 5 and 6. This screen consists of a series of vertical bars, 36, to the opposite sides of which are secured perforated metal plates, 37. Above each screen is located an I-beam, 38, to the under side of which are secured a series of projecting lugs, 39, their projecting ends provided with eyes which receive a top transverse piece, 40, from which the screen depends. Between the vertical bars, near their lower ends, is run a spray pipe, 41, one for each screen, said spray pipes connecting directly with the fresh water pipe, 8. After the water has sprayed through these pipes it drops to a gutter or trough, 42, which leads to and communicates with the basin, 33. Pump 29 now sucks up the water in basin 33, and pumps it on to the attemperaters in compartments 14 through pipes, 18. If desired, also the pump can be made to pump on to the several screens by opening a valve, 43, controlling a pipe, 44, whereby the flow may also be checked and the amount of fresh water regulated. The water from the attemperaters in compartments 14 passes to basin 34 through conduits, 45, the overflow water passing to basin 22 through an overflow pipe, 46, and such as is used over again passes under the partition wall, 35, to be again taken up by pump suction. The end of the overflow pipe 46 which enters basin 34 is bent upward, and this upwardly bent end projects above the bottom of the basin, as shown in Fig. 4, so that it is only after the water reaches a certain height in basin 34 that any passes to basin 22. It will be noticed that the water falling from the screens into the trough or gutter, 42, is conducted directly to basin 33 so that it is impossible for it to pass with the overflow water into overflow pipe 46 to basin 22 to be taken up by pump, 30. This is desirable inasmuch as it is only the water that has been warmed by contact with the air in the attemperaters in compartments, 14, that should be taken up by this pump. The water that passes through the overflow pipe and enters basin 22 is taken up by pump 30 and fed to the attemperaters in compartments, 15, through the pipe, 10, and branch spray pipes, 19. The water thus sprayed into these compartments passes through a conduit, similar to conduit, 24, Fig. 1, to a water basin, similar to 25 same figure. The overflow water is then carried off by an overflow pipe, similar to 26, leading to a sewer, not shown, while some of the water passes under partition wall 27 to basin 22 to be taken up by pump 30 and again utilized for spraying the attemperaters in compartments, 15. It will be noticed that none of the water from the attemperaters in compartments 14 passes directly to this overflow pipe 26, but is carried to basin 22, and this for the reason as before explained that the water from the attemperaters in compartments 14 is cooler, and it is consequently not desirable that any of the same should go to waste before it has had an opportunity to cool the warmer air which flows into compartments 15 from the dry air chamber. The course of air in Fig. 3 is practically the same as in Fig. 1, i. e., from the dry air chamber up and over partitions 47, arranged against the open sides of compartments 15, thence through the attemperaters in said compartments, down and along through the arched channel, 28, up and through attemperaters in compartments 14, then through attemperating screens against the open side of said compartments, into the moist air chamber, from which it is drawn or pressed to suitable openings having communication with the malt house or apartment to which it is desired the moist air should be fed.

The several spray pipes are provided with valves next above the main line so that the water of any one can be cut off, and also by disconnecting the connection the spray pipe can be drawn out for cleaning or repairs.

The numeral, 48, indicates a pipe for exhaust steam from an engine, it being desirable to supply steam in cold weather, or when the temperature falls below the required point, to warm the water and the air to the temperature required. This pipe leads directly to water basin 25, and is preferably of a large circumference, and submerged only about one-fourth of its size. It is provided with a series of holes on its under side for the discharge of steam and the water of condensation into the basin. This hot steam and water heats the water in the basin, which being pumped on to the attemperater 15 correspondingly modifies the surrounding air.

In Figs. 7, 7ª and 7ᵇ, I have shown three different devices which I may use for spraying purposes, which not only throw the water up in a straight solid stream, but also atomize the same as it leaves the jet. In Fig. 7, is shown a small nozzle, 49, engaging a threaded opening in the pipe, said nozzle provided with a small longitudinal bore through which the water finds its exit. Fig. 7ª shows the nozzle with a slightly larger bore, and in this bore is inserted loosely a pin, 50, provided with a spiral rib, 51, which causes the water to be ejected in a spiral stream. Fig. 7ᵇ shows nozzle 49 provided with a threaded end which receives a tube, 52, said tube having a series of supplemental bores, 53, radiating from a central enlarged bore, 54.

The object of constructing the attemperaters of two or more hoods, one fitting over the other, with a slight intervening space, is to provide for the water adhering to the inner sheet as well as to the outer, whereby it is not so easily torn away by the moving air. Furthermore, by providing two or more hoods a large metal surface is presented for cooling and is made wet by a small quantity of water. The water passing in between the perforated sides will run to the bottom of the hood without all being torn away by the moving air. Its peculiar form further permits the sprayed water at the top to run down and to be equally distributed on all sides.

From the foregoing description the construction of my apparatus, it is thought, will be readily understood.

The utility of the invention will now be more fully explained. In cooling air with water, say water at 52° Fahrenheit which is the temperature of the best well water, so as to bring the air to a temperature of 58°, which is a desirable temperature of the air for successful malting, large volumes of water are necessary with apparatuses heretofore in use for so cooling large volumes of air, inasmuch as the heat of the air in such apparatuses will warm the water as the latter cools the air, because if the heat units contained in the air are to be absorbed by the water it is essential that the water should absorb as many heat units as possible before it goes to waste. In doing this, the water comes to within a degree or so of the temperature of the air, and consequently it can have no further useful effect in cooling the air. In my apparatus, however, instead of permitting this water which has been warmed up to approximately 58°, or we will say 57°, to run to waste, I arrange the apparatus so that the fresh water at 52° will enter the apparatus at one place, while air at a much higher temperature than the required temperature of 58° enters at another place. The air in its course is successively acted upon by the water which is gradually increased in temperature in its course, so that the air that reaches the water which enters the apparatus at 52° is in a condition of temperature to be reduced to the required temperature of 58°. After this water at 52° brings the stratum of air to the required temperature of 58°, instead of being wasted, it is carried so as to act upon the air at the place next before it is brought to the required temperature of 58°, and at which point of course it is much higher in temperature, and consequently the temperature of the water is sufficiently low in comparison therewith to subserve a useful effect in reducing the temperature of this air prior to its entrance into the chamber where it is reduced to 58°. So in the apparatus shown in the drawings it will be apparent that the water entering through the fresh water supply pipe at 52° will first act upon the attemperaters in compartments 14, and cool the previously partially cooled air to the required temperature of 58°, and at the same time the water itself is so heated by contact with this air as to be brought to approximately the same temperature, or say 57°, and thus made incapable of absorbing further heat units from this air. In consequence, the water is conducted in the manner clearly pointed out in the specification, to the attemperaters in compartment or compartments 15, where it encounters the air which has passed into said compartments from the dry air chamber, and as this air is considerably higher in temperature than the water, said water is capable of absorbing heat units from this air and render said air of the proper temperature to enter the compartments 14, above referred to, to be reduced to the proper temperature of 58°. It will be noticed also by the arrangement of the apparatus herein shown and described that, of this last water, only the overflow goes to waste, while the residue is again thrown on the attemperater in compartment or compartments 15 to be again utilized therein. For this reason more work is done on attemperater, 15, than on attemperater, 14, simply by returning the water and thus increasing the volume of the same. From the foregoing it will be obvious that should only one attemperater be employed all the water would have to go to waste at about the temperature rendered to it by the air, or say 57°, having been raised to within 1° of the air, after cooling the air in the first instance to 58°, with a useful effect therefrom of only 5°, whereas in my multiple apparatus by the repeated and successive use of the water, the air is correspondingly modified step by step, and the entire cooling capability of the water is economized, and its utility for this purpose is wholly appropriated, without losing or wasting any of its energy in this direction.

Having thus described my invention, what I claim, and desire to secure by Letters Patent of the United States, is—

1. In an apparatus for attemperating air, the combination, of an apartment or building provided with dry and moist air chambers, masonry intermediate said chambers forming a series of compartments having communication with each other, whereby air may circulate through the same from the dry air chamber to the moist air chamber, some of said compartments opening into the dry air chamber and others into the moist air chamber, attemperaters within the compartments, and pipes for spraying the attemperaters, said pipes so constructed and arranged that the water from the source of supply is first sprayed upon the air in the compartments opening into the moist air chamber which air had been previously cooled in its passage through the compartment or compartments opening into the dry air chamber, and then subsequently sprayed upon the air passing through the latter compartments, before the air reaches the other compartments, substantially as set forth.

2. In an apparatus for attemperating air, the combination, of an apartment or building provided with dry and moist air chambers, masonry intermediate said chambers forming a series of compartments having communication with each other whereby air may be made to circulate through the same from the dry air chamber to the moist air chamber, one or more of said compartments opening into the dry air chamber and others into the moist air chamber, attemperaters within the compartments, pipes for spraying the attemperaters, said pipes constructed and arranged so that the water from the source of supply is sprayed upon the air in the compartments opening into the moist air chamber, which air had been previously cooled in its passage through the compartment or compartments opening into the dry air chamber, and then subsequently the surplus or overflow sprayed upon the air passing through the latter compartments before said air reaches the other compartments leading to the moist air chamber, and conduits whereby the discharged water from the attemperaters, above the surplus which feeds the other set of compartments, is carried back to be again utilized in connection with the fresh water supply, substantially as set forth.

3. In an apparatus for attemperating air, the combination, of an apartment or building provided with dry and moist air chambers, masonry intermediate said chambers forming a series of compartments having communication with each other, whereby the air may be made to circulate through the same from the dry air chamber to the moist air chamber, one or more of said compartments opening into the dry air chamber and others into the moist air chamber, attemperaters within the compartments, pipes for spraying the attemperaters, said pipes constructed and arranged as described whereby the water from the source of supply is first sprayed upon the air in the compartments opening into the moist air chamber which has been previously cooled in its passage through the compartments opening into the dry air chamber, and then subsequently sprayed upon the air passing through the latter compartments before said air reaches the other compartments, and a pipe communicating with a water basin in the dry air chamber for the discharge of condensed and live steam for heating the water in the water basin and ultimately the air in the attemperaters in cold weather or when the temperature falls below the desired point, substantially as set forth.

4. In an apparatus for attemperating air, the combination, with a spray pipe, of an attemperater consisting of plurality of hoods one placed over the other with a slight space intervening, between each said hoods having perforated sides, substantially as set forth.

5. In an apparatus for attemperating air, the combination, of an apartment or building provided with dry and moist air chambers, masonry intermediate said chambers forming a series of compartments having communication with each other, one or more of said compartments opening into the dry air chamber and others opening into the moist air chamber, screens covering the openings of the latter compartments which communicate with the moist air chamber, and a pipe for spraying the screens substantially as set forth.

6. In an apparatus for attemperating air, the combination, of an apartment or building provided with dry and moist air chambers, masonry in said chambers forming a series of compartments having communication with each other whereby the air may be made to circulate through the same from the dry air chamber to the moist air chamber, one or more of said compartments opening into the dry air chamber and others into the moist air chamber, attemperaters in the compartments, longitudinal parallel pipes connected by a horizontal pipe and having spray pipes passing beneath the attemperaters, a supply pipe leading to one of these pipes, a force pump communicating with the horizontal connecting pipe and also having a pipe extending into a basin, conduits connecting the compartments opening into the moist air chamber with the basin, a second basin provided with an overflow pipe and having communication with the first named basin, and a conduit connecting the compartment or compartments opening into the dry air chamber with this second basin, substantially as set forth.

7. In an apparatus for attemperating air, the combination, of an apartment or building provided with dry and moist air chambers, masonry intermediate said chambers forming a series of compartments having communication with each other, whereby the air may be made to circulate through the same from the dry air chamber to the moist air chamber, some of said compartments opening into the dry air chamber and others into the moist air chamber, attemperaters in the compartments, longitudinal parallel pipes, having spray pipes passing beneath the attemperaters, one of said pipes receiving water from a source of supply, basins upon opposite sides of the apartment, the basins composing each set communicating with each other, conduits leading from the compartments opening into the moist air chamber to one of the basins on that side of the building, an overflow pipe connecting said basin with the basin diagonally opposite on the other side of the building, a force pump connecting with the longitudinal pipe on the side of the building where the dry air chamber is located, said pump provided with a pipe leading to the basin next thereto, and conduits connecting the compartments opening into the dry air chamber with the basin adjacent, substantially as set forth.

8. In an apparatus for attemperating air, the combination of an apartment or building provided with dry and moist air chambers, masonry intermediate said chambers forming a series of compartments having communication with each other, some of said compartments opening into the dry air chamber and others into the moist air chamber, attemperaters in the compartments, longitudinal parallel pipes having spray pipes passing beneath the attemperaters, force pumps to which these pipes respectively lead, basins upon opposite sides of the compartment of the building each basin of a set communicating with each other, pipes connecting each of the force pumps with one basin of each set, attemperating screens, covering the sides of the compartments which open into the moist air chamber, a supply pipe, spray pipes connected therewith and leading to the attemperating screens, a trough beneath these screens leading to one of the basins of a set nearest the air pump, an overflow pipe connecting one of the basins on the moist air side of the apartment with the basin diagonally opposite, conduits connecting the compartments opening into the moist air chamber with the basin adjacent, similar conduits for the other compartments connecting the same with their adjacent basin, and an overflow pipe leading from this last named basin, substantially as set forth.

9. In an apparatus of the character described, the combination with perforated hoods or screens forming attemperaters, of closed caps over the tops of the hoods adapted to arrest water sprayed through the hoods and return it to the hoods, substantially as set forth.

In testimony whereof I affix my signature in presence of two witnesses.

JOHN F. DORNFELD.

Witnesses:
C. T. BENEDICT,
ANNA V. FAUST.